US008111425B2

(12) United States Patent
Inoue

(10) Patent No.: US 8,111,425 B2
(45) Date of Patent: Feb. 7, 2012

(54) IMAGE PROCESSING METHOD AND IMAGE FORMING DEVICE

(75) Inventor: Yoshiaki Inoue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 499 days.

(21) Appl. No.: 12/414,350

(22) Filed: Mar. 30, 2009

(65) Prior Publication Data

US 2009/0244579 A1 Oct. 1, 2009

(30) Foreign Application Priority Data

Mar. 31, 2008 (JP) ................................ 2008-094001

(51) Int. Cl.
*H04N 1/60* (2006.01)
*H04N 1/405* (2006.01)
*B41J 2/00* (2006.01)

(52) U.S. Cl. ........... 358/1.9; 358/3.1; 347/131; 347/188

(58) Field of Classification Search ........................ None
See application file for complete search history.

(56) References Cited

U.S. PATENT DOCUMENTS 6,375,293 B1 * 4/2002 Endo ................................ 347/2
7,850,275 B2 * 12/2010 Yoshida et al. ................. 347/19

FOREIGN PATENT DOCUMENTS

JP 2006-264069 A 10/2006
JP 2007-160748 A 6/2007

* cited by examiner

*Primary Examiner* — Charlotte M Baker
(74) *Attorney, Agent, or Firm* — Birch, Stewart, Kolasch & Birch, LLP

(57) ABSTRACT

An image processing method comprises: a step of acquiring recording characteristic information of the recording elements; a step of obtaining inconsistent density correction information from the recording characteristic information acquired in the characteristic information acquiring step; a step of obtaining inconsistency corrected image data from the inconsistent density correction information and data of the input image; a step of generating inconsistency correction unfit image position information by detecting an inconsistency correction unfit image from data of the input image; a step of obtaining image data having an N number of tones from the inconsistency corrected image data; a step of judging whether non-correctable conditions arise according to the inconsistent density correction information and the inconsistency correction unfit image position information; and a step of alerting a user to an image anomaly according to judgment results given in the image anomaly judgment processing step.

6 Claims, 10 Drawing Sheets

IMAGE PROCESSING METHOD AND IMAGE FORMING DEVICE

The entire contents of literature cited in this specification are incorporated herein by reference.

BACKGROUND OF THE INVENTION

The present invention relates to an image processing method and an image forming device and particularly to an image processing method that may be appropriately used to correct inconsistent density arising from a variation in characteristics among recording elements of a recording head and an image forming device using this image processing method.

Note that the inconsistent density as used herein includes inconsistency attributable to a nozzle's failure to discharge ink, as will be described.

An image forming device (e.g., ink jet printer) provided with an ink jet type recording head having ink discharge nozzles is liable to develop an inconsistent density (stripes) in a recorded image because of a variation in ink discharge characteristics among nozzles (e.g., discharge direction, discharge amount, ink drop amount, and failure to discharge). The nozzle's discharge characteristics, a main cause of stripes, may be broken down to landing position error in a direction in which the nozzles are arranged, drop amount error, failure to discharge, and the like. These nozzle's discharge characteristics cause inconsistent density in the form of stripes.

While, as is known in the art, inconsistent density can be prevented by a multi-pass printing in the case of a shuttle scan type image recording device where image recording is accomplished by causing the recording head to scan a given printing area a plurality of times, preventing inconsistent density as described above is difficult with the line-head type that accomplishes image recording in one scan.

However, most of the image forming devices (e.g., ink jet printers) intended to offer a high speed and a high accuracy perform a single-pass drawing using line heads as described above. In such a case, multi-nozzle recording heads having an output resolution as high as say about 1200 dpi are used to achieve a high-quality image. To achieve such a resolution, marked ink dots each having a diameter of 30 μm or greater may be used in some applications to fill up each space ($p\times\sqrt{2}$=about 30 μm, where pitch p=21.2 μm) of a grid having a resolution of 1200 dpi×1200 dpi.

With a printer such as one of shuttle scan type described above that permits change of resolutions according to the scan mode, a plurality of resolutions meeting various purposes intended are set and dots with matching diameters are provided so as to achieve an optimum image quality and productivity in most of the cases. With a single-pass printer as mentioned above, the resolution is fixed, and a single dot diameter is provided to meet normal output conditions.

As the number of nozzles increases, a single-pass printer as mentioned above is liable, as expected, to develop flaws in nozzles with a certain probability. A flaw in recording characteristics of a nozzle causes an image defect (inconsistent density in stripes), and various methods have been proposed to address this problem of inconsistent density.

Presently, various inconsistent density correction methods are used. By these methods, inconsistent density is corrected basically by changing the density in the output image according to the characteristics of the respective recording elements. The methods may be broken down to two types: one whereby discharge drive conditions specific to each recording element is set to adjust dot diameters and dot densities, and the other whereby image data or dot densities (number of dots) are varied to correct the inconsistent density.

Out of the two methods, the latter is used more widely because the former method is limited in the type of heads that may be used and a range by which correction can be made, while the latter permits a greater freedom.

For example, JP 2006-264069 A discloses a technique for measuring the densities of areas corresponding to the respective recording element positions to correct the inconsistent density of the corresponding printing area. JP 2007-160748 A discloses a method for efficiently and accurately calculating a density correction coefficient from a characteristics error of recording elements (marked ink dot interval error).

To convert image data by the inconsistent density correction method, a 1D-LUT that is specific to each recording element is used to effect γ conversion. There are two methods of obtaining a correction curve (inconsistency correction coefficient) of the 1D-LUT: one whereby, as described in JP 2006-264069 A, the densities of areas corresponding to the respective recording element positions are measured to correct the inconsistent density of the corresponding printing area and the other whereby, as described in JP 2007-160748 A, a drop discharge position accuracy of a recording element is measured accurately to obtain a correction coefficient from the position information.

In recent years, image forming devices intended to offer a high speed and a high accuracy use line heads to perform a single-pass drawing in most of the cases. Accordingly, where a multi-nozzle recording head having an output resolution of, for example, 1200 dpi is used, a marked ink dot interval error must be held to a minimum.

The technique disclosed in JP 2007-160748 A is capable of accurately correcting an inconsistency if a marked dot position can be measured as recording element information. Where the marked dot position accuracy is poor (position error is great), however, this technique can develop a flaw when a calculated correction coefficient is applied to a particular image.

For example, FIGS. 10A and 10B illustrate a case where a nozzle nzl4 draws a line by successively discharging 6 marked ink dots. As illustrated in FIG. 10A, when a nozzle nzl3 has an error ΔX=0, a dot is marked at the position of the nozzle nzl4; as illustrated in FIG. 10B, when ΔX=0.4 L, for example, the density decreases by 30% and when Δx=0.7 L, the line totally disappears.

The value ΔX represents an error from an ideal dot position by a ratio to an ideal distance L. For example, when ΔX=1.0 L, the two dots overlap entirely.

For reference, FIG. 11 is a block diagram illustrating an inconsistency correction technique practiced in the art; FIG. 12 is a flow chart of operations corresponding to FIG. 11.

SUMMARY OF THE INVENTION

Thus, it is an object of the invention to provide an image forming device capable of detecting an image of which the inconsistency cannot be appropriately corrected by any known inconsistency correction method and providing an appropriate treatment thereof and an image forming device using this method.

More specifically, an object of the invention is to provide an image forming method that solves the above problems associated with the prior art and permits appropriate treatment even when, for example, a nozzle in the recording head fails to discharge ink to draw a line-work image and an image forming device using this method.

An image processing method according to the present invention comprises: a characteristic information acquiring step of acquiring recording characteristic information of the recording elements; an inconsistent density correction information calculating step of obtaining inconsistent density correction information from the recording characteristic information acquired in the characteristic information acquiring step; a density correction processing step of obtaining inconsistency corrected image data from the inconsistent density correction information and data of the input image; an unfit image detection step of generating inconsistency correction unfit image position information by detecting an inconsistency correction unfit image from data of the input image; an N-value conversion processing step of obtaining image data having an N number of tones from the inconsistency corrected image data; an image anomaly judgment processing step of judging whether non-correctable conditions arise according to the inconsistent density correction information and the inconsistency correction unfit image position information; and an image anomaly alerting step of alerting a user to an image anomaly according to judgment results given in the image anomaly judgment processing step.

An image forming device according to the present invention comprises: printing means including a full-line type recording head having a plurality of recording elements arranged over a length corresponding to a full width of a recording medium; transporting means that moves the recording head relative to the recording medium by moving at least one of the recording head and the recording medium; information acquiring means that acquires information indicating recording characteristics including a recording position error and discharge failure of the recording elements; inconsistent density correction information calculating means that obtains inconsistent density correction information based on the recording characteristic information acquired by the information acquiring means; density correction processing means that obtains inconsistency corrected image data from the inconsistent density correction information and data of the input image; unfit image detection means that generates inconsistency correction unfit image position information by detecting an inconsistency correction unfit image from data of the input image; N-value conversion processing means that obtains image data having an N number of tones from the inconsistency corrected image data; image anomaly judgment processing means that judges whether non-correctable conditions arise according to the inconsistent density correction information and the inconsistency correction unfit image position information; and image anomaly alert means that alerts a user to an image anomaly according to judgment results given by the image anomaly judgment processing means.

BRIEF DESCRIPTION OF THE DRAWINGS

The invention will be better understood by reference to the following description taken in conjunction with the accompanying drawings in which.

DETAILED DESCRIPTION OF THE INVENTION

Now, the basic principle of the invention will be first described, followed by a detailed description of the invention based upon the preferred embodiments illustrated by the accompanying drawings.

Figure 7:
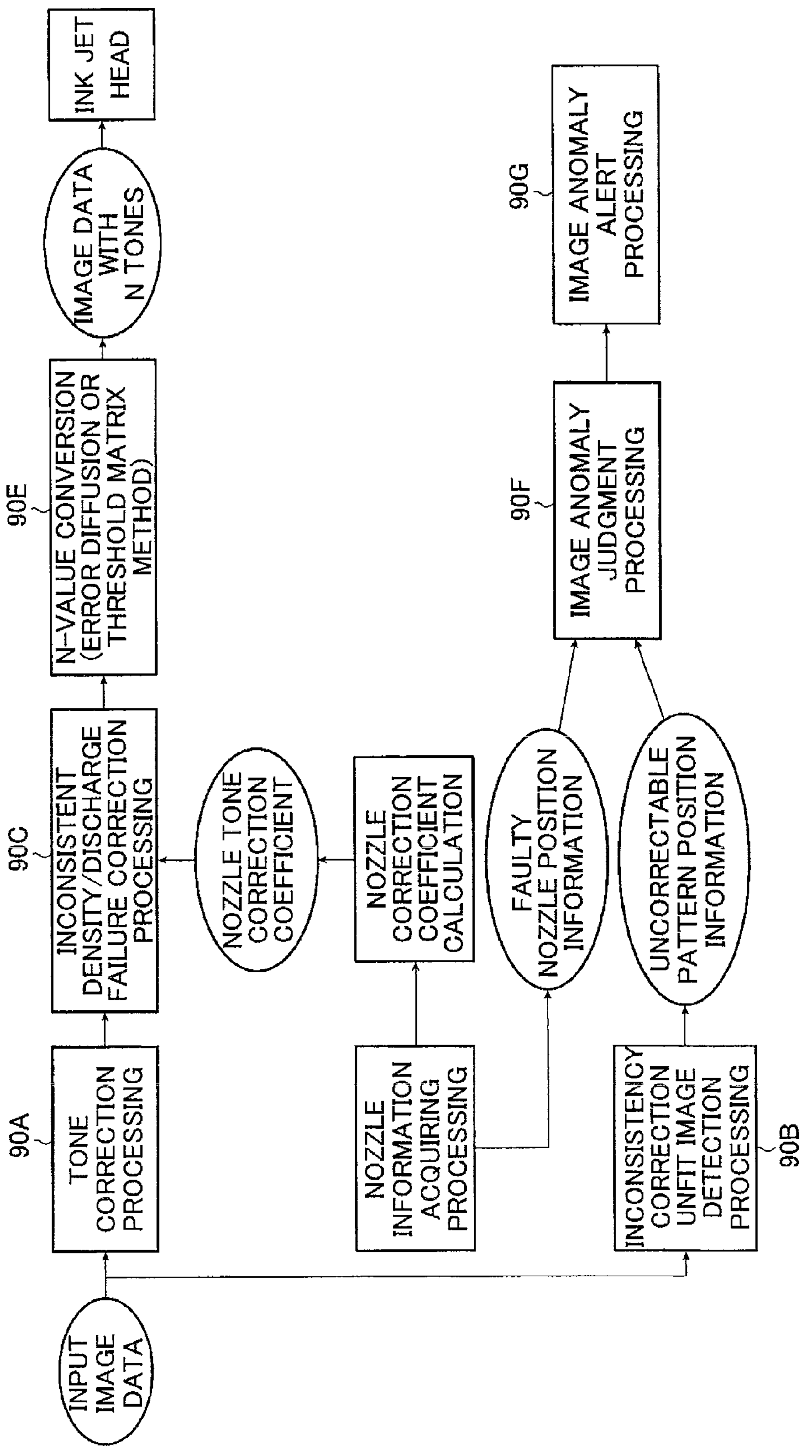
FIG. 7 is a functional block diagram illustrating an image processing method according to one embodiment of the invention.

FIG. 7 is a functional block diagram illustrating an image processing method according to an embodiment of the invention.

Image data entered in an ink jet recorder, which is an image forming device, represents a continuous tone image having the same number of colors and the same resolution as used in the ink jet recorder. In the case of an ink jet recorder capable, for example, of an output resolution of 1200 dpi using four colors cyan (C), magenta (M), yellow (Y), and black (K), image data represents each color with 8 bits (256 tones).

FIG. 7 illustrates a processing flow for one color. Therefore, four such processing flows proceed in parallel in the case of a four-color ink device. As the number of output colors increases to provide, for example, 6 or 7 colors, so does the number of parallel processing flows to match the number of colors.

While image data may be outputted in various formats, a processing related thereto may be performed in a stage preceding those illustrated in FIG. 7 in an RIP (raster image processor) to permit entry of image data having a desired resolution for each color of ink. Such processing may include color conversion from RGB to CMYK and resolution conversion.

Entered image data undergoes a tone conversion processing in a tone correction processing step 90A to obtain desired tones. Concurrently, a judgment is made in an inconsistency correction unfit image detection step 90B to determine whether a pixel to be processed out of the pixels of the image data is correctable by an inconsistency correction processing, whereupon nozzle position information is produced to identify a nozzle corresponding to an uncorrectable pixel of uncorrectable image data.

In a inconsistency correction processing (inconsistent density/discharge failure correction processing) step 90C, which is performed in the same manner as described in, for example, JP 2007-160748 A, discharge failure nozzle position information is produced while acquiring nozzle information.

In an image anomaly judgment processing step 90F, when a nozzle matches both nozzle position information identifying a nozzle corresponding to an uncorrectable image and discharge failure nozzle position information mentioned above, a judgment is made that image anomaly will occur; when no nozzle matches both information, a judgment is made that image anomaly will not occur.

When a judgment is made that image anomaly will occur, the user is notified of the occurrence of a possible image anomaly in an image anomaly alert processing step 90G (or an alarm indicating an image anomaly is given to, for example, a control display.

Such a notification may be effected by any of various methods including indication of characters on a display, flashing of an image, an error window that is popped up, a sound alarm including a voice alarm, and a turned flashing light.

It is preferable to display not only image anomaly but also the position where the image anomaly is occurring.

The processing to follow may be performed according to inconsistent density correction processing known in the art.

First, a nozzle correction coefficient is obtained for inconsistent density/discharge failure correction processing. This can be accomplished in a preferred manner using the technique described in JP 2007-160748 A described earlier.

Specifically,

1) A test pattern is printed to obtain data on the nozzle position and a proper amount of drop for each of the nozzles in their respective positions.

2) The test pattern is measured to obtain a tone correction coefficient $d_i$ for each nozzle i following the steps in the technique described in JP 2007-160748 A.

3) From a viewpoint of versatility, the correction coefficient is preferably fine adjusted using a one-dimensional table for each nozzle because, in practice, an optimum inconsistency correction coefficient slightly varies with density. The fine-adjusted coefficient is kept as a one-dimensional table for each nozzle to provide nozzle tone correction data.

Next, actual printing operations will be described. Image data entered in their respective data formats undergoes rasterization, color-conversion, and other processing in an RIP (raster image processor), which is not shown, and entered in an inconsistency correction control unit for performing inconsistency correction processing with a resolution with which it is actually outputted and in separate printing plates appropriate for the printer (e.g., cyan plate, magenta plate, yellow plate, and black plate, each having an 8-bit 1200-dpi tone). In this embodiment, the inconsistency correction control unit is provided in a control device that has an overall control of the ink jet printer operations according to the invention as will be described.

The inconsistency correction processing by the inconsistency correction control unit mentioned above is performed concurrently for 4 colors in a 4-color printer and for 6 or 7 colors in a 6- or 7-color printer. Description will be given herein for one of the printing plates (printing plate for one color).

Now, let D(x, y) denote entered 8-bit image data. The letter x indicates the position of a pixel in a width direction of an image; y indicates the position of the pixel in the vertical direction of the image. D(x, y) indicates the pixel value at a position (x, y). The entered image data D(x, y) is first processed in the tone correction processing step so that the actual tone characteristics of the ink jet printer is converted to optimum tone characteristics desired. With the tone conversion curve converted into a one-dimensional LUT, the pixel value after tone conversion can be expressed as F(D(x, y)), where F is the conversion function.

As described above, F is a one-dimensional LUT that is set separately for each color printing plate. The effects produced by a temporal change, individual difference and material difference, for example, are corrected in the tone correction processing step.

Subsequently, inconsistency of the image data is corrected in the inconsistency correction processing step 90C using an outputted inconsistency correction table Gi that is specific to each recording element i. The data obtained may be expressed as Gi(F(D(x, y),i). The corrected image data Gi(F(D(X, Y),i) is processed in an N-value conversion processing step 90E.

The N-value processing determines the size of dots used to represent the output tone; the N value may be selected from binary (discharge/non-discharge of a dot with a certain size), ternary (e.g. a standard-size/large discharged dot), and quaternary or more (e.g., a plurality of standard-size/large discharged dots).

Now, the invention will be described in detail based upon preferred embodiments illustrated in the attached drawings.

Figure 1:
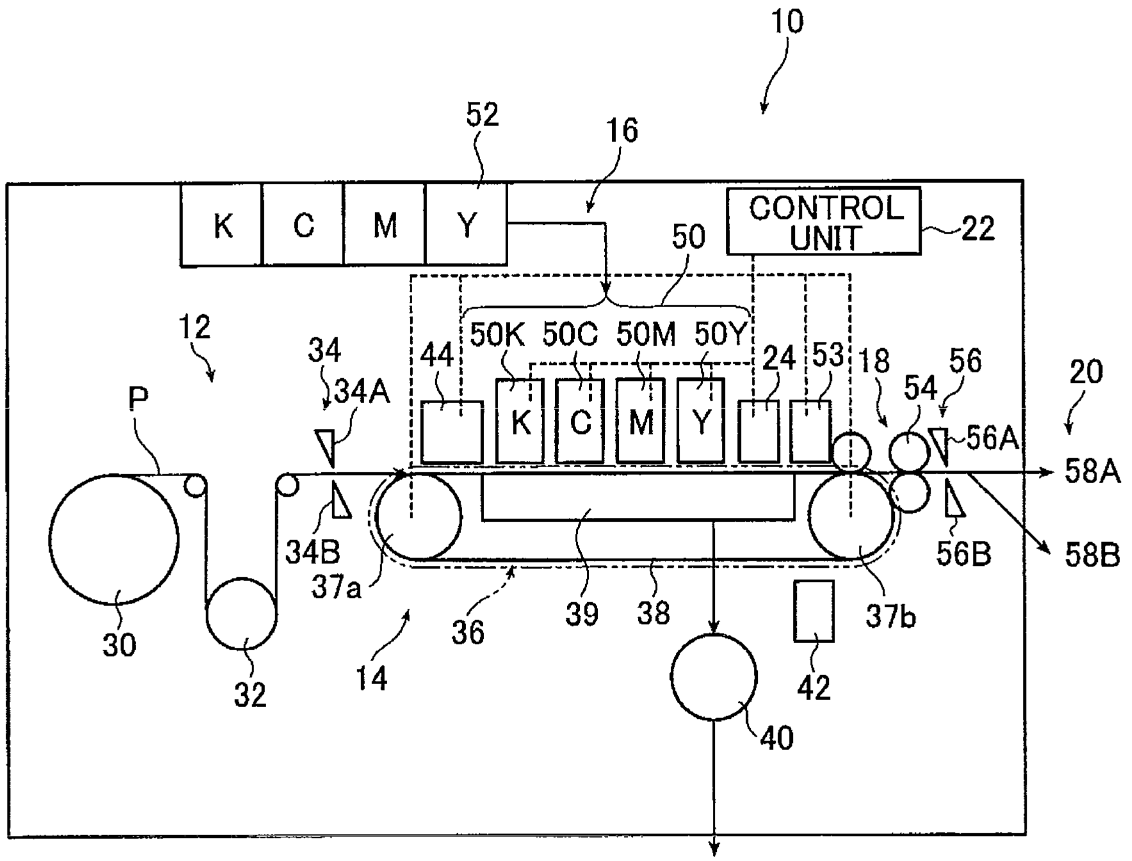
FIG. 1 is a schematic view illustrating a configuration of the image recording device according to an embodiment of the invention.
Figure 2:
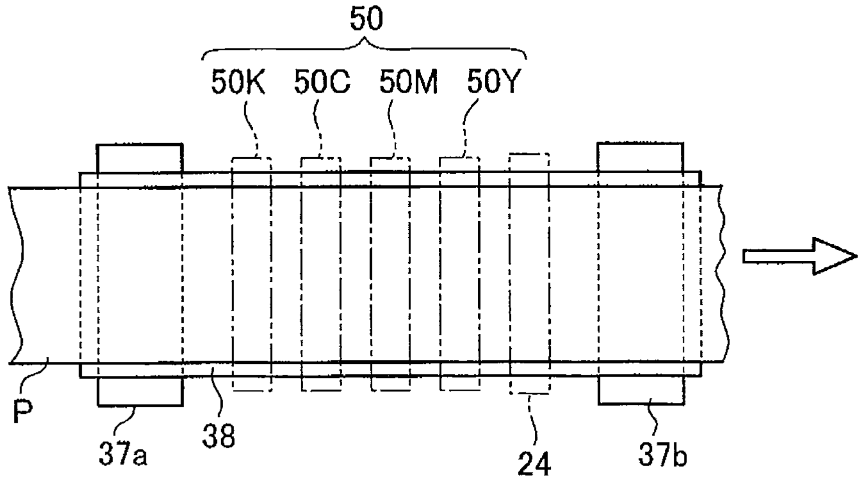
FIG. 2 is a top plan view illustrating a suction transport belt and a recording head unit in the image recording device illustrated in FIG. 1.

FIG. 1 is a schematic front view illustrating a configuration of the ink jet recorder (referred to as "image recording device" below) 10, which is an embodiment of the inventive image forming device using the image processing method of the invention; FIG. 2 is a top plan view illustrating a suction belt transport unit 36 and a recording head unit 50 of the image recording device 10 illustrated in FIG. 1.

The image recording device 10 basically comprises a feed assembly 12 for feeding a recording medium P, a transport assembly 14 for transporting the recording medium P fed from the feed assembly 12 with the recording medium P kept flat, a drawing assembly 16 including a recording head unit 50 disposed opposite the transport assembly 14 to draw an image on the recording medium P and an ink reservoir/filler unit 52 for storing ink fed to the recording head unit 50, a heating/pressing assembly 18 for heating and pressing the recording medium P on which an image has been drawn, an ejection assembly 20 for discharging to the outside the recording medium P now bearing the image, a scanner 24 for reading the image recorded on the recording medium P by the drawing unit 16, and a control unit 22 for controlling the above assemblies.

The feed assembly 12 comprises a magazine 30, a heating drum 32, and a cutter 34.

The magazine 30 contains a roll of the recording medium P. When an image is drawn, the recording medium P is fed from the magazine 30 to the heating drum 32.

The heating drum 32 is disposed downstream of the magazine 30 on the recording medium transport path to heat the recording medium P fed from the magazine 30, with the recording medium P bent in a reverse direction to that in which it was bent as it was stored in the magazine 30.

The heating drum 32 heats the recording medium P to remove the curled shape imparted to the recording medium P while it was stored in the magazine 30. In other words, the heating drum 32 decurls the recording medium P.

Preferably, the heating temperature is controlled so that the printing surface slightly curls outwards.

The cutter 34 comprises a fixed blade 34A having a length greater than the width of the recording medium transport path and a round blade 34B that moves along the fixed blade 34A. The round blade 34B is disposed on the opposite side of the recording medium P from that on which an image is to be recorded; the fixed blade 34A is disposed on the opposite side of the transport path from the round blade 34B.

The cutter 34 cuts the heating drum P fed past the heating drum 32 to a desired size.

In this embodiment, the feed assembly has one magazine. The invention is not limited to such a configuration, and two or more magazines may be provided to house recording media that are different in, for example, paper width, paper quality, and kind. In addition to or in place of the magazine, a cassette may be provided containing a number of cut sheets having a predetermined length. When using only a recording medium P previously cut to a predetermined length as the recording medium P, the heating roller and the cutter described above need not necessarily be provided.

When using a plurality of magazines and/or cassettes with a configuration where two or more kinds of recording paper can be used, it is preferable that an information recording unit such as bar code and wireless tag where information including, for example, the kind of paper is recorded is attached to the magazines and/or cassettes so that a reader can read out information recorded in the information recording unit to allow automatic recognition of the kind of paper used and perform ink discharge control and achieve an appropriate ink discharge according to the kind of paper.

The transport assembly 14 comprises the suction belt transport unit 36, a suction chamber 39, a fan 40, a belt cleaner 42, and a heating fan 44. The transport assembly 14 conveys the recording medium P, which was decurled and cut to a desired length by the feed assembly 12, to a position where the drawing assembly 16 to be described draws an image on the recording medium P.

The suction belt transport unit 36 is disposed downstream of the cutter 34 on the recording medium transport path and comprises a roller 37*a*, a roller 37*b*, and a belt 38.

The belt 38 is an endless belt having a width greater than that of the recording medium P and passed over the roller 37*a* and the roller 37*b*. The belt 38 has numerous suction pores (not shown) formed in its surface.

At least the image drawing (printing) area of the suction belt transport unit 36, i.e., the area thereof opposite the nozzle faces of the recording head unit 50 to be described of the drawing unit 16, and the image detecting area of the suction belt transport unit 36, i.e., the area thereof opposite the sensor face of the scanner 24 to be described, are kept flat and parallel to the nozzle faces and the sensor face.

At least one of the rollers 37*a* and 37*b* over which the belt 38 is passed is connected to a motor not shown. Thus, the power generated by the motor is transmitted to the belt 38 through at least one of the rollers 37*a* and 37*b* to drive the belt 38 clockwise as seen in FIG. 1 and transport the recording medium P held on the belt 38 rightwards in FIG. 1.

The means for transporting the recording medium P is not limited specifically; a roller nip transport mechanism may be used in place of the suction belt transport unit 36. Because the roller nip transport is liable to cause the image to feather as the roller touches the printing surface of the paper immediately after printing in the drawing region, the suction belt transport as in the embodiment under discussion is preferable whereby the image surface is not touched by the belt when passing through the drawing region.

The suction chamber 39 is provided on the inside of the belt 38 and opposite the nozzle faces of the recording head unit 50 to be described of the drawing assembly 16 and the sensor face of the scanner 24. The fan 40 is connected to the suction chamber 39. The suction chamber 39 is sucked by the fan 40 to produce a negative pressure therein and hold the recording medium P onto the belt 38 by suction.

The recording medium P, sucked onto the belt, can be held firmly.

The belt cleaner 42 is disposed on the outside of the belt 38 so as to face the outer surface of the annular belt 38 and located off the recording medium transport path. Accordingly, the belt 38 passes by the drawing assembly 16, discharges the recording medium P to pressure rollers 54 to be described and then passes by a position opposite the belt cleaner 42.

The belt cleaner 42 removes ink that has stuck to the belt 38 after printing borderless photographs or the like. The belt cleaner 42 may be configured by employing, for example, a method using a roller nip assembly using brush rolls or water-absorbing rolls, an air-blowing method whereby clean air is blown, or a method combining those methods. When a method using nipped cleaner rolls is employed, high cleaning effects are produced by giving the belt and rolls different linear velocities from each other.

The heating fan 44 is disposed on the outside of the belt 38 and upstream of the recording head unit 50 to be described of the drawing assembly 16 on the recording medium transport path.

The heating fan 44 blows hot air onto the recording medium P before drawing to heat the recording medium P. Heating the recording medium P before drawing makes it easier for ink to dry after landing on the recording medium P.

The drawing assembly 16 comprises the recording head unit 50 for drawing (printing) an image and the ink reservoir/filler unit 52 for supplying ink to the recording head unit 50.

The recording head unit 50 comprises the recording heads 50K, 50C, 50M, and 50Y, and is located opposite the surface of the belt 38 on which the recording medium P is placed.

The recording heads 50K, 50C, 50M, and 50Y are piezoelectric ink jet heads that discharge inks each having the colors of black (K), cyan (C), magenta (M), and yellow (Y) from discharge units and are disposed opposite the surface of the belt 38 bearing the recording medium P and somewhat closer to and downstream of the heating fan 44 in the recording medium transport direction. The recording heads 50K, 50C, 50M, and 50Y are arranged in this order, with the head 50K closest to the heating fan 44. The recording heads 50K, 50C, 50M, and 50Y are connected to an ink reservoir/filler unit 52 and the control unit 22.

The recording heads 50K, 50C, 50M, and 50Y are full-line type ink jet heads having discharge units (nozzles) disposed in arrays over a length exceeding a maximum width of the recording medium P in the direction normal to the recording medium transport direction as illustrated in FIG. 2. The configuration of the ink jet heads will be described later in detail including its relationship with the ink reservoir/filler unit 52.

Use of a full-line type recording heads as in this embodiment enables an image to be recorded on the whole surface of the recording medium P by moving the recording medium P and the drawing unit 16 once relative to each other (i.e., in one scan) in the direction normal to the direction in which the discharge units of the recording heads extend (i.e., auxiliary scan direction). Thus, the full-line type heads are capable of rapid printing and hence increase productivity as compared with the shuttle type heads wherein the recording heads reciprocate in the main scan direction.

The ink reservoir/filler unit 52 comprises ink supply tanks for storing inks each having colors corresponding to the recording heads 50K, 50C, 50M, and 50Y, respectively.

Each ink supply tank may, for example, be of a type whereby the tank is refilled with ink from an inlet (not shown) when the ink is running short or of a cartridge type whereby the whole tank is replaced.

The ink supply tanks of the ink reservoir/filler unit 52 are connected through conduit lines, not shown, to the recording heads 50K, 50C, 50M, and 50Y, respectively, to supply the recording heads 50K, 50C, 50M, and 50Y with inks.

Preferably, the ink reservoir/filler unit 52 comprises alert means (display means, alarm sounding means, etc.) that, when ink is running short, gives a notification to that effect and a mechanism for preventing refill with ink of a wrong color.

When different kinds of ink are employed according to use, the cartridge type is preferably used. Preferably, a bar code or the like is used to identify the kind of ink and thus achieve a discharge control that is specific to the kind of ink.

Now, the structures of the recording heads 50K, 50C, 50M, and 50Y will be described. Since the recording heads 50K, 50C, 50M, and 50Y share the same configuration except for the color of the discharged ink, the recording head 50K will be described below as a representative.

Figure 3A:
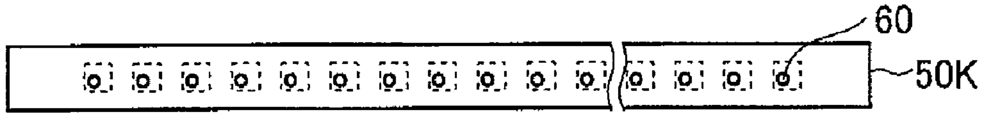
FIG. 3A is a front view illustrating an arrangement pattern of discharge units of a recording head.
Figure 3B:
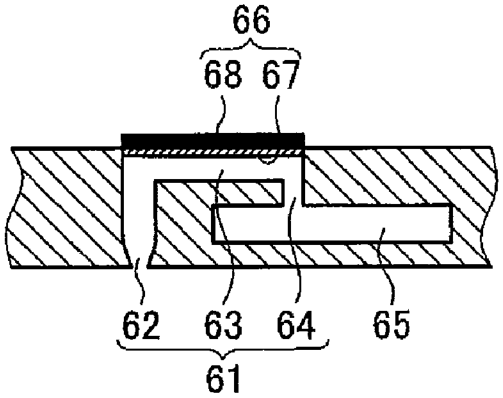
FIG. 3B is an enlarged cross-section of a discharge unit of the recording head illustrated in FIG. 3A.

FIG. 3A is a front view illustrating an arrangement pattern of the discharge units of the recording head 50K; FIG. 3B is an enlarged cross-section of one discharge unit 60 of the recording head 50K.

As illustrated in FIG. 3A, the recording head 50 K comprises recording elements 60 that discharge ink drops (referred to below as "discharge units"). The discharge units 60 are arrayed at regular intervals.

As illustrated in FIG. 3B, one discharge unit 60 comprises an ink chamber unit 61 and an actuator 66. The ink chamber unit 61 is connected to a common flow channel 65. The common flow channel 65 is connected to the ink chamber units 61 of a plurality of discharge units 60.

Each ink chamber unit 61 comprises a nozzle 62, a pressure chamber 63, and a supply inlet 64.

The nozzle 62 is an opening through which ink drops are discharged, one end thereof being open opposite the recording medium P and the other end connected to the pressure chamber 63.

The pressure chamber 63 is a rectangular solid having a substantially square planar figure in a plane normal to the direction in which ink drops are discharged. Two diagonally positioned corners of the square are connected to the nozzle 62 and the supply inlet 64, respectively.

One end of the supply inlet 64 communicates with the pressure chamber 63 and the other end communicates with the common flow channel 65.

The actuator 66 is provided on the top side or the side opposite from the surface of the pressure chamber 63 over which the nozzle 62 and the supply inlet 64 communicate. The actuator 66 comprises a pressure plate 67 and an individual electrode 68.

The actuator 66 operates in such a manner that when a drive voltage is applied to the individual electrode 68, the pressure plate 67 deforms.

Next, the method whereby the discharge unit 60 discharges ink will be described.

Ink is fed from the common flow channel 65 through the supply inlet 64 to the pressure chamber 63 and the nozzle 62.

When the drive voltage is applied to the individual electrode 68, with both the pressure chamber 63 and the nozzle 62 filled with ink, the pressure plate 67 deforms to pressurize the pressure chamber 63, causing the nozzle 62 to discharge ink. Thus operating the actuator 66 causes the nozzle 62 to discharge an ink drop.

Upon discharge of ink, fresh ink is fed to the pressure chamber 63 from the common flow channel 65 through the supply inlet 64.

The configuration of the discharge unit according to the invention is not limited specifically to the example illustrated in the drawings. Although the embodiment uses an ink discharge method whereby the actuator 66 as exemplified by a piezoelectric element is deformed to discharge ink drops, the invention is not limited to this; in place of the method using a piezoelectric element, one may use a thermal jet method whereby ink is heated by a heat generator such as a heater to produce air bubbles, which in turn generates a pressure that causes an ink drop to be discharged.

Now, the relationship between the recording head 50 and the ink reservoir/filler unit 52 will be described in greater detail.

Figure 4:
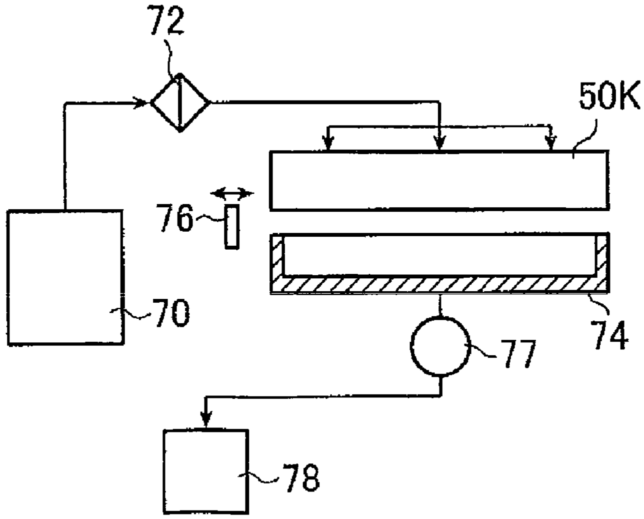
FIG. 4 is a schematic view illustrating peripherals of an ink supply system and the recording head in the image recording device.

FIG. 4 is a schematic view illustrating peripherals of an ink supply system and the recording head of the image recording device 10. The recording heads 50K, 50C, 50M, and 50Y all have the same relationship with the ink reservoir/filler unit 52 except for the kind of ink. Therefore, the relationship of the ink reservoir/filler unit 52 with only the recording heads 50K will be described below, and the relationship of the ink reservoir/filler unit 52 with the recording heads 50C, 50M, and 50Y will be omitted.

An ink supply tank 70 is a tank for storing ink of a color corresponding to the recording head 50K, i.e., black ink, and is disposed inside the ink reservoir/filler unit 52. The recording head 50K and the ink supply tank 70 communicate through a supply duct.

A filter 72 is provided in the middle of a flow channel connecting the ink supply tank 70 and the recording head 50K to remove foreign matter and air bubbles. The filter 72 preferably has a filter mesh size not greater than the nozzle diameter (typically about 20 μm).

Preferably, an auxiliary tank is provided close to or integrally with the recording head 50K. The auxiliary tank provides a damper effect to prevent fluctuation of the head's internal pressure, thus improving the refill operation.

As illustrated in FIG. 4, the image recording device 10 further comprises a cap 74 to prevent the nozzle 62 from drying or the viscosity of ink close to the nozzle from increasing, a suction pump 77 and a collecting tank 78, and a cleaning blade 76 for cleaning the nozzle faces of the recording head 50K, i.e., the surface in which the nozzles 62 each have an opening.

A maintenance unit comprising the cap 74 and the cleaning blade 76 permits relative movement with respect to the recording head 50K through a moving mechanism, which is not shown, so that it can be moved, when necessary, from a given retracted position thereof to a maintenance position beneath the recording head 50K.

In the maintenance position, the cap 74 is located opposite the recording head 50K and so supported as to be vertically movable with respect to the recording head 50K by a lifting mechanism, which is not shown.

When the power is turned off or the recording device is in a printing standby mode, the cap 74 is lifted to a given position by the lifting mechanism so that it is in close contact with the recording head 50K to cover the nozzle faces of the recording head 50K.

Covering the nozzle faces of the recording head 50K with the cap 74 to place it in a sealed state prevents the ink in the nozzles from drying and hence sticking and further keeps the ink solvent from evaporating, which would otherwise increase ink viscosity.

At the time of maintenance or periodically, the actuator 66 may be operated to cause the nozzle 62 to discharge ink, with the cap 74 attached to the recording head 50K.

When a particular nozzle 62 is used with an increasingly reduced frequency and thus has not discharged ink for a given period of time or longer, ink solvent near the nozzle may evaporate, and ink viscosity may be thereby increased, making it impossible to discharge ink from the nozzle 62. Then, a preliminary ink discharge into the cap 74 (purge, idle discharge, or spitting) can expel degraded ink in the nozzle 62 (ink near the nozzle having an increased viscosity) from inside the nozzle 62. This prevents clogging of ink in the nozzles 62 and prevents variation in ink viscosity among the nozzles 62, which would otherwise cause variation in discharge characteristics among the nozzles. Thus, stable ink drop discharge can be ensured.

The suction pump 77 has one end thereof connected to the cap 74 and the other end to the collecting tank 78. Upon suction effected by the suction pump 77, with the cap 74 attached to the recording head 50K in close contact, the ink inside the nozzle 62 is sucked out. The ink sucked by the suction pump 77 is fed to the collecting tank 78.

Thus, even when the actuator 66 fails to cause a nozzle to discharge ink because of, for example, air bubbles that have entered the ink (pressure chamber 63) in the recording head 50K, suction of ink by the suction pump 77 causes the ink inside the pressure chamber 63 (ink containing air bubbles mixed therein) to be removed. Thus, the recording head is restored to a state where it can discharge ink drops.

Preferably, suction by the suction pump 77 is performed also at the time of refill of fresh ink in the head or when use is resumed after a long-term disuse in order to suck out degraded ink of which the viscosity has increased (i.e., hardened ink).

Further, suction of ink, which is performed on the whole ink inside the pressure chamber 63, consumes a great amount of ink. Accordingly, where increase in ink viscosity is small, the above-mentioned preliminary discharge of ink drops into the cap 74 is preferable.

The cleaning blade 76 is formed of an elastic material such as rubber. At the time of maintenance, it is disposed in contact with the nozzle surfaces of the recording head 50K. The cleaning blade 76 is connected to a blade moving mechanism (wiper), not shown, so that it is moved over the nozzle faces by the blade moving mechanism. The cleaning blade 76 wipes off ink drops and foreign matter adhered to the nozzle surfaces as the cleaning blade 76 slides over the nozzle surfaces. Thus, the cleaning blade 76 cleans the nozzle surfaces.

Preferably, preliminary discharge is performed before cleaning the ink discharge surface with the blade in order to prevent foreign matter from entering the nozzles 62 as the blade sweeps.

Returning to FIG. 1, other components of the image recording device 10 will be described.

The heating/pressing assembly 18 comprises a post-drying unit 53 and a pair of pressure rollers 54 to heat/press the recording medium P bearing an image drawn by the drawing assembly 16 and dry the image to fix it.

The post-drying unit 53 is disposed downstream of the recording head unit 50 and opposite the belt 38 on the recording medium transport path. The post-drying unit 53 is a heating fan or the like for blowing hot air onto the image bearing side of the recording medium P to dry the image that has been drawn.

Preferably, the post-drying unit 53 uses a heating fan to blow hot air.

Drying the ink of the image on the recording medium using the heating fan enables drying without touching the image. This prevents occurrence of defects or smears in the image drawn on the recording medium P.

The pair of pressure rollers 54 are disposed downstream of the post-drying unit 53 on the recording medium transport path. The pair of pressure rollers 54 nips and transports the recording medium P that has passed the post-drying unit 53 and parted from the belt 38.

The pressure rollers 54 has a surface provided with a given relief pattern. As the pressure rollers 54 heats and presses the image surface of the recording medium P transported by the suction belt transport unit 36, the pattern is transferred onto the image surface.

When dye-based ink is used for printing on porous paper, for example, applying pressure causes the pores of the paper to close, which prevents contact with substances such as ozone, can be a cause to destroy the dye molecules, and thus provides the image with an enhanced weather resistance.

The image recording device 10 has a cutter (second cutter) 56 disposed downstream of the heating/pressing assembly 18 on the recording medium transport path.

The cutter 56 comprises a fixed blade 56A and a round blade 56B and cuts off a normal image part from an image part for misalignment detection in cases where the recording medium P is printed with both.

The ejection assembly 20 comprises a first ejection unit 58A and a second ejection unit 58B and is provided downstream of the cutter 56 on the recording medium transport path. The ejection assembly 20 ejects the recording medium P bearing the image that has been fixed by the heating/pressing assembly 18.

In this embodiment, selection means, not shown, switches between a first ejection unit 58A and a second ejection unit 58B according to the image recorded on the recording medium P so that a recording medium bearing a normal image is ejected to the first ejection unit 58A and a recording medium bearing an image used for misalignment detection or an unnecessary recording media is ejected to the ejection unit 58B.

Preferably, the ejection assembly 20 comprises a sorter adapted to collect images according to orders placed.

Although it is preferable to provide two ejection units to permit selection of an ejection unit according to use, the invention is not limited to this. Only one ejection unit may be provided, for example, so that all the recording media is ejected through one ejection unit. Alternatively, three or more ejection units may be provided.

The control unit 22 controls transport and heating of the recording medium P, drawing of an image thereon, detection of an inconsistent image density, and other operations performed by, among others, the feed assembly 12, the transport assembly 14, the drawing assembly 16, the heating/pressing assembly 18, the ejection assembly 20, and the scanner 24. The configuration of the control unit 22 will be described later in detail.

The scanner 24 is disposed opposite the outer side (outer peripheral surface) of the belt 38 and between the recording head unit 50 and the post-drying unit 53. The scanner 24 comprises image sensors (e.g., line sensors) for imaging (i.e., reading) a test pattern formed by the drawing assembly 16. The image sensor reads an image recorded on the recording medium. The scanner 24 is capable of reading an image with a resolution that is selectable as desired from at least two different resolutions.

The scanner 24 according to this embodiment comprises line sensors each having an array of photoreceptors longer than the ink discharge width (image recording width) of the recording heads 50K, 50C, 50M, and 50Y. The line sensors are color separation line CCD sensors comprising an array of R sensors including photo-electric transducers (pixels) having a red color filter, an array of G sensors including photo-electric transducers (pixels) having a green color filter, and an array of B sensors including photo-electric transducers (pixels) having a blue color filter. The line sensors may be replaced by an area sensor having photoreceptors arranged two-dimensionally.

Figure 5:
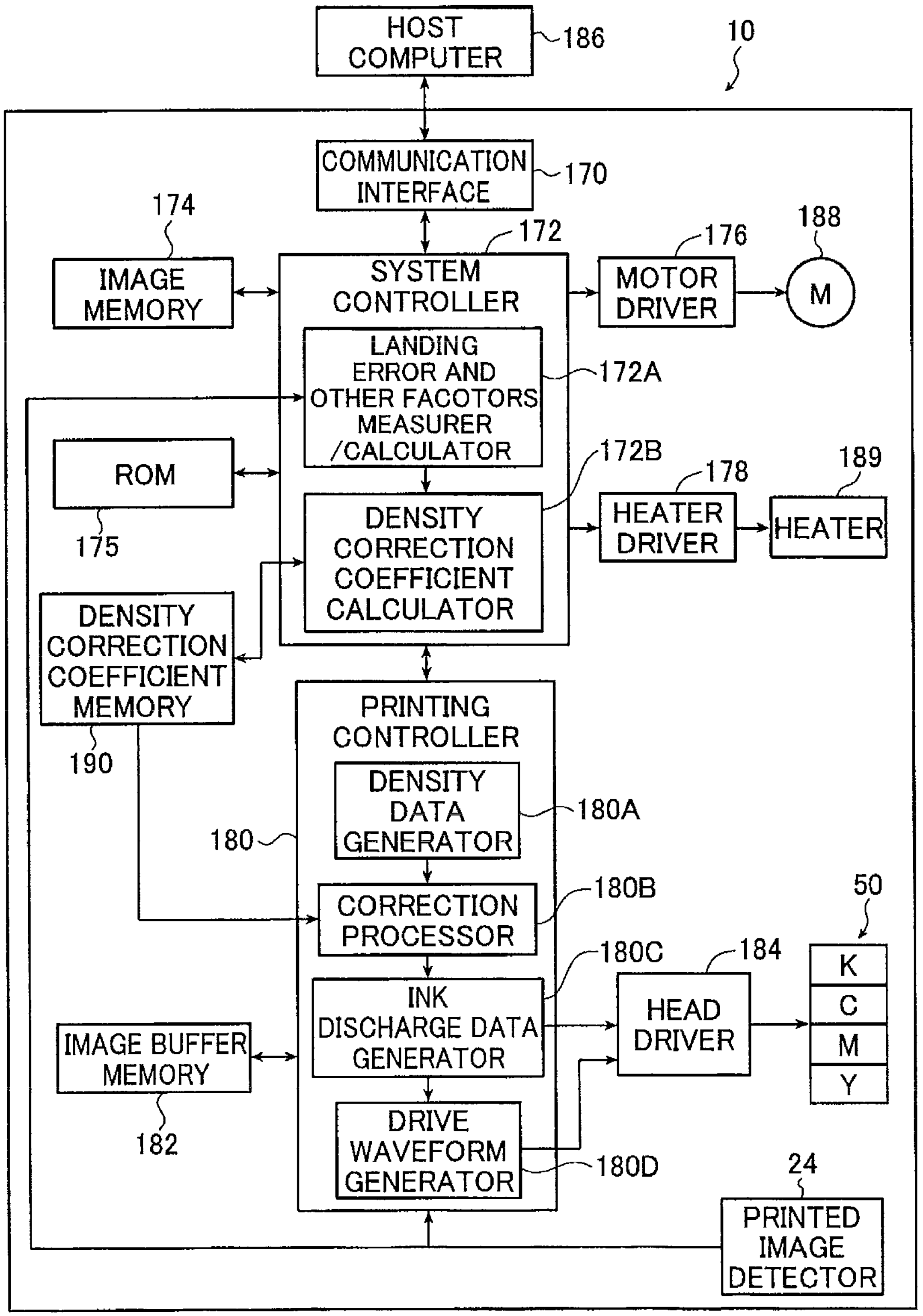
FIG. 5 is a block diagram illustrating a system configuration of the image recording device.

FIG. 5 is a block diagram illustrating a system configuration of the image recording device 10. The image recording device 10 comprises a communication interface 170, a system controller 172, an image memory 174, a ROM 175, a motor driver 176, a heater driver 178, a printing controller 180, an image buffer memory 182, and a head driver 184.

The communication interface 170 is an interface (image input unit) to serve as image receiving means for receiving image data sent from a host computer 186. The communication interface 170 may be a serial interface such as USB (universal serial bus), IEEE1394, Ethernet (trademark), a wireless network or a parallel interface such as Centronics. The interface may be provided with a buffer memory (not shown) to increase the communication speed.

Communications data sent from the host computer 186 is loaded on the image recording device 10 through the communication interface 170 and temporarily stored in the image memory 174. The image memory 174 is memory means for storing an image entered through the communication interface 170 and allows data read/write through the system controller 172. The image memory 174 need not necessarily be a memory composed of a semiconductor element; it may be a magnetic medium such as a hard disk.

The system controller 172 comprises a central processing unit (CPU) and its peripheral circuits and functions as a controller to control the overall operation of the image recording device 10 according to a given program and serves also as a computing device for performing various computations. Specifically, the system controller 172 controls, among others, the communication interface 170, the image memory 174, the motor driver 176, and the heater driver 178, controls communications with the host computer 186 and read/write in the image memory 174 and the ROM 175, and produces a control signal for controlling a motor 188 used for transport and a heater 189.

Further, the system controller 172 comprises a landing error and other factors measurer/calculator 172A and a density correction coefficient calculator 172B. The landing error and other factors measurer/calculator 172A performs computation for producing data including landing position error, drop amount error, and discharge failure from read/write data of the test pattern read from the printed image detector (scanner) 24; the density correction coefficient calculator 172B calculates a density correction coefficient from information on the landing position error, the drop amount error, and the discharge failure as measured. The landing error and other factors measurer/calculator 172A and the density correction coefficient calculator 172B may be given such processing functions using an ASIC, software or an appropriate combination.

Density correction coefficient data obtained in the density correction coefficient calculator 172B is stored in a density correction coefficient memory 190.

The ROM 175 stores data necessary for the programs and controls performed by the CPU of the system controller 172 (including test pattern data for measuring the landing position error and other values). The ROM 175 may be a non-rewritable memory or a rewritable memory like an EEPROM. Further, the ROM 175 may be adapted to serve also as the density correction coefficient memory 190 by using the storage area of the ROM 175.

The image memory 174 is used not only as a temporary image data storage area but also as an area for running programs therein and for the CPU to perform computations therein.

The motor driver 176 is a driver (drive circuit) for actuating the transport motor 188 according to the instructions given by the system controller 172. The heater driver 178 actuates the heater 189 and the like provided in the post-drying unit 53 according to the instructions given by the system controller 172.

The printing controller 180 performs signal processing such as reprocessing and corrections to generate an ink drop discharge control signal from image data (multivalued input image data) in the image memory 174 according to the control by the system controller 172. The printing controller 180 supplies generated ink discharge data to control the discharge drive of the head unit 50.

Accordingly, the printing controller 180 comprises a density data generator 180A, a correction processor 180B, an ink discharge data generator 180C, and a drive waveform generator 180D. These function blocks (180A to 180D) may be constituted using an ASIC, software or an appropriate combination thereof.

The density data generator 180A is a signal processing means for generating ink color-specific initial density data from input image data and performs density conversion processing (including UCR processing and color conversion) and, where necessary, pixel count conversion processing.

Referring to FIG. 5, the correction processor 180B is a processing means for performing density correction computation using a density correction coefficient stored in the density correction coefficient memory 190. The correction processor 180B performs inconsistent density/discharge failure correction processing in the step 90C in FIG. 7.

In FIG. 5, the ink discharge data generator 180C is a signal processing means comprising a half-toning processing means for converting post-correction density data generated by the correction processor 180B into binary (or multivalued) dot data and performs binarization (multivalue conversion) described earlier with regard to the step 90E in FIG. 7. Ink discharge data generated in the ink discharge data generator 180C in FIG. 5 is supplied to the head driver 184 to control the ink discharge operation of the recording head unit 50.

The drive waveform generator 180D generates a drive signal waveform for driving an actuator 66 (see FIG. 3B) provided for each nozzle 62 of the recording head unit 50. The signal (drive waveform) generated by the drive waveform generator 180D is supplied to the head driver 184. The signal produced from the drive waveform generator 180D may be a digital waveform data or an analog voltage signal.

The printing controller 180 has the image buffer memory 182 that temporarily stores data such as image data and parameters at the time of image data processing performed in the printing controller 180. While the image buffer memory 182 is illustrated in FIG. 5 as a subordinate unit to the printing controller 180, the image memory 174 may be adapted to serve also as the image buffer memory 182. Further, the printing controller 180 and the system controller 172 may be combined to provide a single processor performing the functions of both units.

In a general flow of the processing from entry of an image to production of a print proceeds, data of an image to be printed is entered from the outside through the communication interface 170 and stored in the image memory 174. At this stage, multivalued RGB image data, for example, is stored in the image memory 174.

The image recording device 10 changes a fine dot density or dot size represented by ink (color material) to form an image that has a simulated continuous tone to the human eye. Thus, the dot pattern needs to be converted into one that reproduces the tone (shading of the image) of an input digital image as faithfully as possible. Accordingly, RGB data of the original image stored in the image memory 174 is sent through the system controller 172 to the printing controller 180 and converted into dot data of respective inks through the density data generator 180A, the correction processor 180B, and the ink discharge data generator 180C of the printing controller 189.

That is, the printing controller 180 converts input RGB image data into dot data in four colors K, C, M, and Y. Thus, dot data generated in the printing controller 180 is stored in the image buffer memory 182. The dot data in different colors is converted into CMYK dot data for discharging ink from the nozzles of the recording head unit 50, thus determining ink discharge data for a given print.

The head driver 184 outputs drive signals for driving corresponding actuators 66 for pertinent nozzles 62 of the recording head unit 50 according to the contents to be printed based upon ink discharge data and drive waveform signals supplied from the printing controller 180. The head driver 184 may include a feedback control system for keeping the head drive conditions constant.

Thus, drive signals outputted from the head driver 184 and supplied to the recording head unit 50 cause the pertinent nozzles 62 to discharge ink. An image is formed on the recording medium P as the ink discharge from the recording head unit 50 is controlled in synchronism with the transport speed of the recording medium P.

As described above, amounts and timing of ink drop discharge from the nozzles are controlled through the head driver 184 according to ink discharge data and drive waveform signals generated through necessary signal processing steps in the printing controller 180. Thus, desired dot sizes and dot arrangements can be obtained.

As described with reference to FIG. 1, the printed image detector (scanner) 24 is a block comprising an image sensor. It reads the image printed on the recording medium P and performs signal processing as required to detect the printing conditions (discharge and non-discharge, inconsistency of marked dots, optical density, etc.), sending detection results to the printing controller 180 and the system controller 172.

The printing controller 180 performs corrections, where necessary, on the recording head unit 50 according to information obtained from the printed image detector (scanner) 24 and, when required, controls preliminary discharge, suction, and cleaning (nozzle recovery) such as wiping. That is, the printing controller 180 functions as control means for causing head cleaning to be performed when a judgment is made that correction is impossible.

The image recording device 10 having the configuration as described above enables acquisition of an optimum image having a reduced inconsistency in density.

Now, supplementary description of the image processing method and the image forming device according to the invention will be made.

Figure 6A:
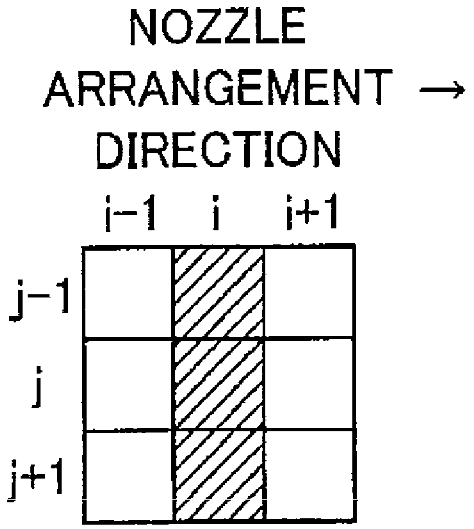
FIGS. 6A and 6B are views for explaining a method of detecting an inconsistency correction unfit image.
Figure 6B:
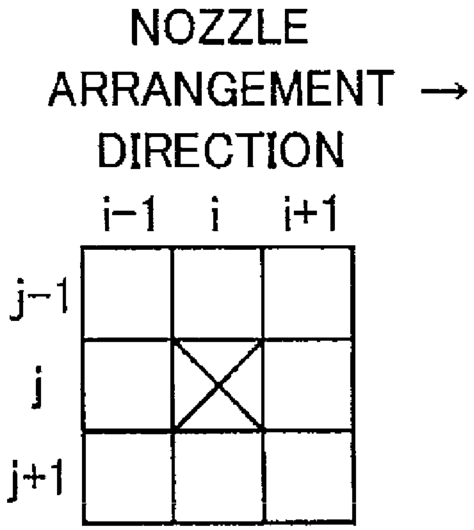

FIGS. 6A and 6B illustrate an example of the inconsistency correction unfit image detection step according to one embodiment of the image processing method of the invention; FIG. 7 is a functional block diagram illustrating operations of the image processing method including the inconsistency correction unfit image detection step.

In the example illustrated in FIGS. 6A and 6B, an unfit pattern (image) can be detected by making a judgment in respect of each pixel as to whether it agrees with, for example, the 3×3 pattern illustrated in FIG. 6A. Specifically, an original image is binarized (either image data has a value of 1 or more or no image data exists) to find a sum of values after the binarization in a row range of "j−1" to "j+1," where (i, j) represents a pixel of interest.

When the sum is found to be 0 in the columns "i−1" and "i+1" and 3 in the column i, the pixel of interest (the central pixels in FIG. 6B) is judged to belong in unfit columns (unfit columns for inconsistency correction) That is, the column including these pixels is judged to be an unfit column. A pixel that is not judged to be unfit is judged to be a fit pixel.

Note that the configuration of unfit inconsistency detection means illustrated in FIG. 6 is only an example and the invention permits various other methods such as one whereby image patterns that may cause a flaw are previously stored to permit comparison of an image pattern of interest with the stored patterns.

The inconsistent density correction processing step 90C illustrated in FIG. 7 performs a known inconsistent density correction processing as described above, which normally uses a 1D-LUT.

Image data that has undergone correction in the inconsistent density correction processing step 90C is subsequently sent to the N-value conversion processing step 90E to determine the dot size for reproducing the output tone using a known method such as a threshold matrix method or an error diffusion method. In this step, the most common ternary value (a standard-size discharged dot and a large discharged dot to compensate for discharge failure or achieve a high density), for example, is selected to form image data.

More specifically, standard dots and correction dots (large dots) are generated according to the input 8-bit value in the N-value conversion processing step 90E.

The image data that has undergone N-value conversion in the N-value conversion processing step 90E is converted to data for the head driver under the control by the printing controller and then sent to the recording head through the head driver for printing.

Now, another embodiment of the image processing method and the image forming device according to the invention will be described referring to FIGS. 8 to 9.

Figure 9:
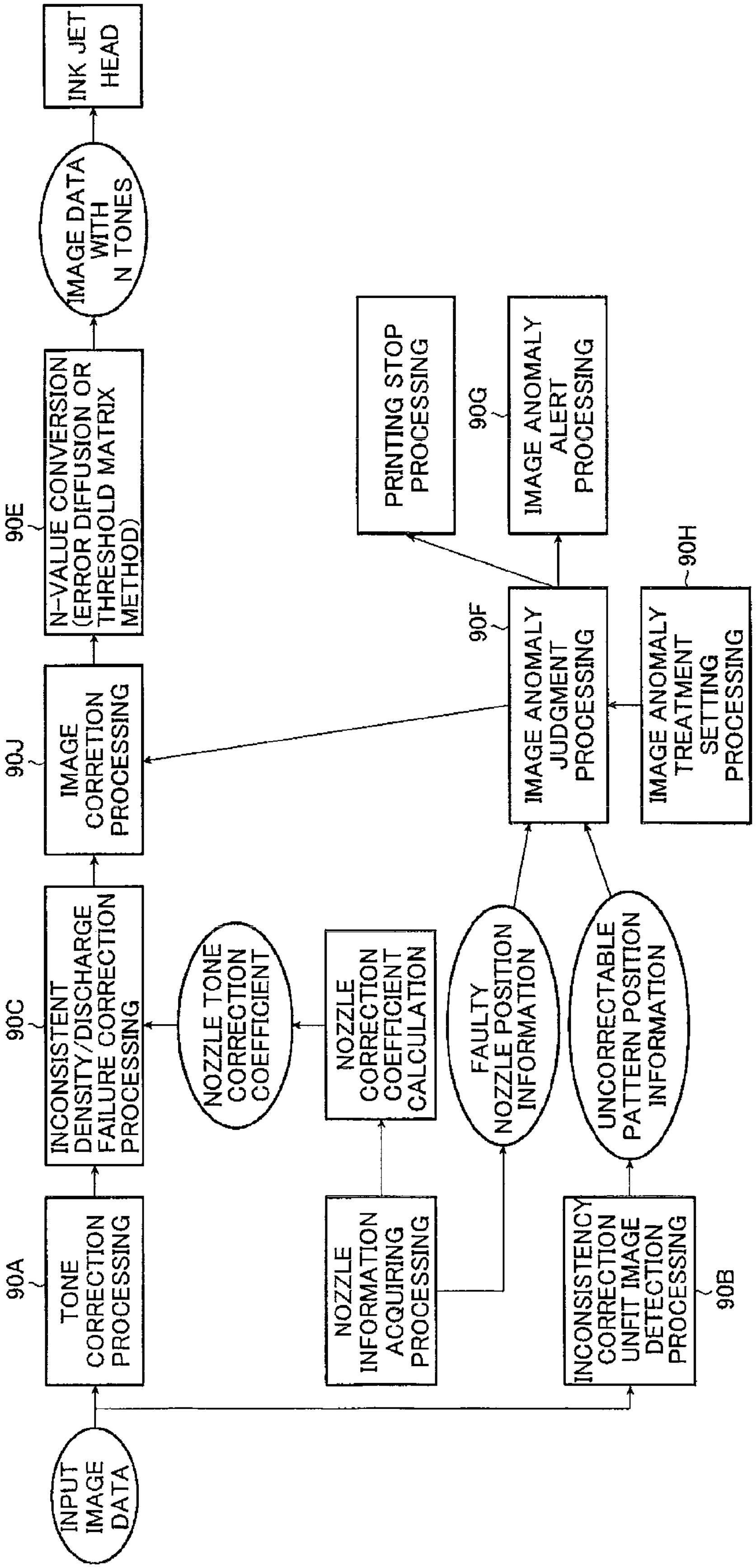
FIG. 9 is a functional block diagram illustrating an image processing method according to another embodiment of the invention.
Figure 10A:
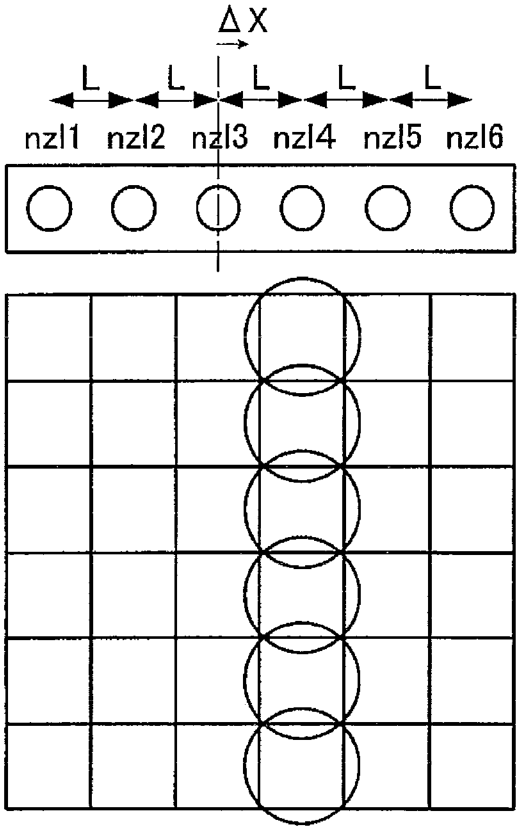
FIGS. 10A and 10B are views for explaining a behavior of conventional nozzles operating abnormally.
Figure 10B:
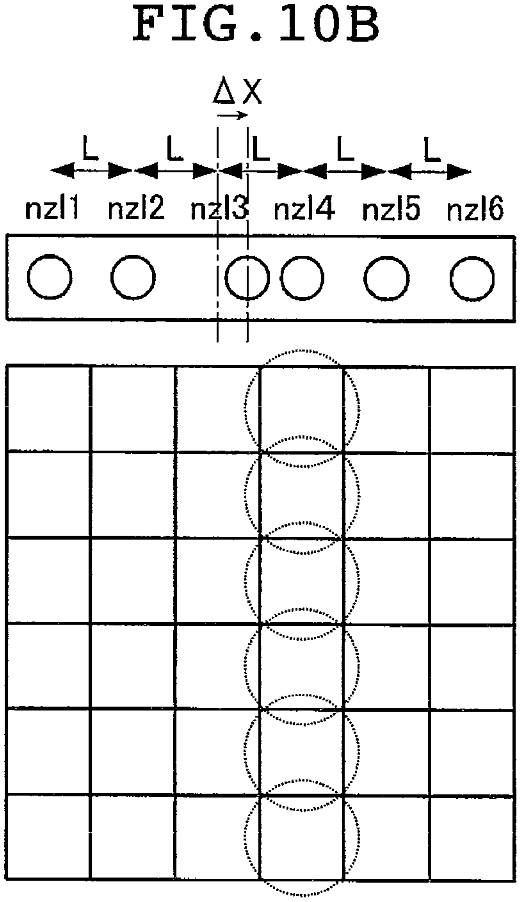
Figure 11:
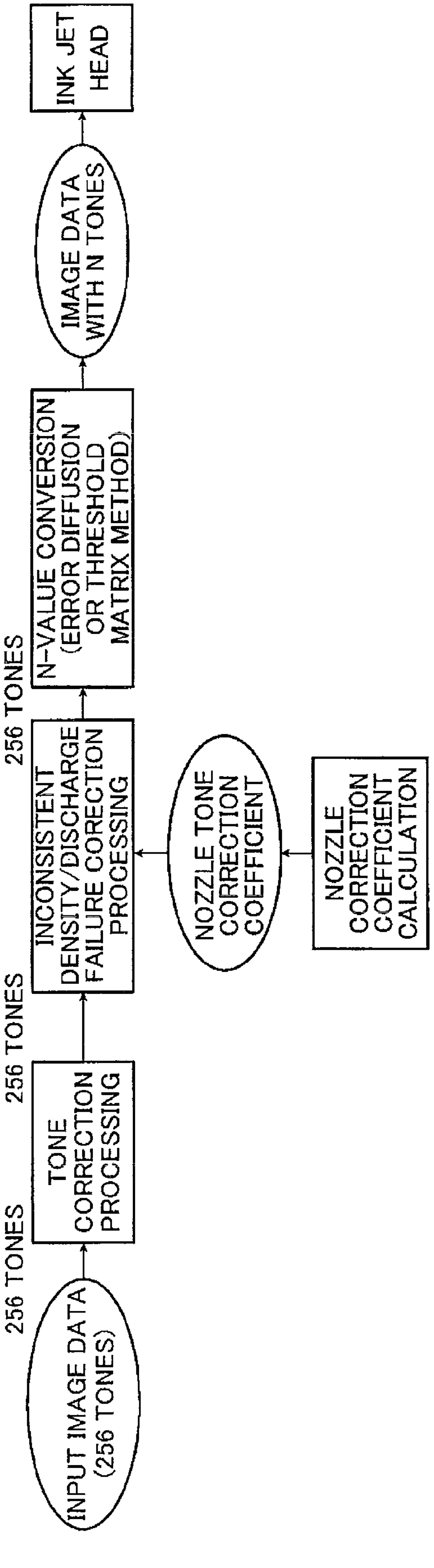
FIG. 11 is a block diagram illustrating a conventional method of correcting an inconsistent density.
Figure 12:
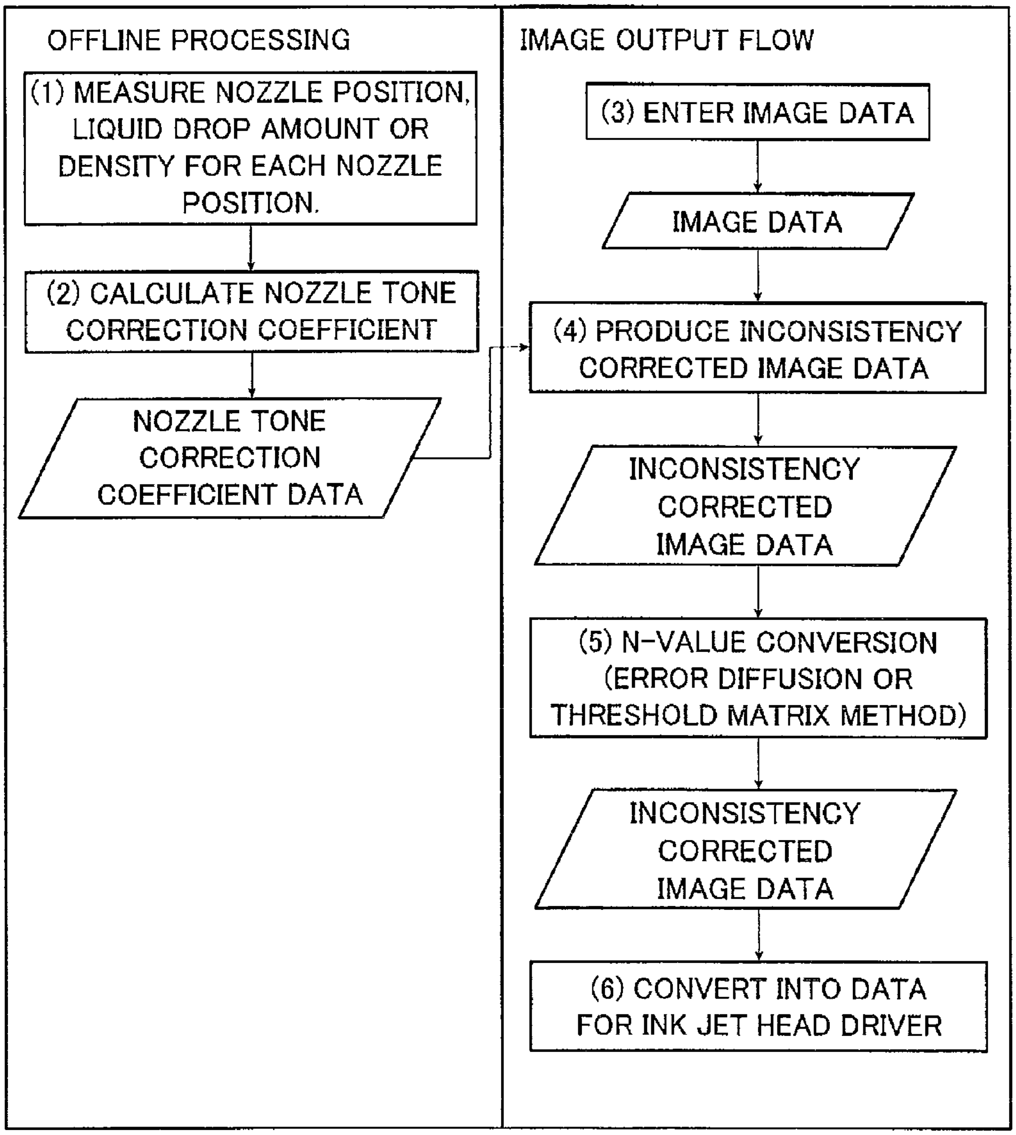
FIG. 12 is a flow chart of operations corresponding to FIG. 11.

An example illustrated in FIG. 9 permits the user to previously enter the kinds of rectification with which to address anomalies when any of them occurs and corresponding levels of the rectification, and optionally allows correction of an abnormal image.

The image forming device according to this embodiment comprises an image anomaly rectification setting processing step 90H and an image correction processing step 90J in an inconsistency correction unit of the image forming device according to the embodiment described earlier so that the levels for identifying anomalies and the corresponding rectification methods can be set.

The above image anomaly rectification setting processing step 90H allows the user to verify the conditions of an image anomaly predicted to occur and set a rectification method in response to various levels of anomalies according to the kind and use of the recorded material (printouts).

For example, the isolated one line described earlier may be treated as follows: (1) printing is accomplished without alerting to the anomaly; (2) an alert to the anomaly is given, and printing is continued; (3) a given image correction is performed if possible; or (4) printing is discontinued immediately.

In the image anomaly rectification setting processing step 90H, one of the possible rectification methods is set and the image anomaly judgment processing step 90F follows.

When an anomaly is verified in the image anomaly judgment processing step 90F, operations according to the above rectification method are instructed to the corresponding step.

In the case where "printing is accomplished without alerting to the anomaly" as in (1) above, printing is continued without performing any rectification; in the case where "an alert to the anomaly is given and printing is continued" as in (2) above, the anomaly is alerted to in an image anomaly alert processing step 90G and printing is continued.

In the case where "a given image correction is performed if possible" as in (3) above, the image is corrected in the image correction processing step 90J; in the case where printing is discontinued immediately as in (4) above, printing is literally discontinued immediately in a printing discontinuance step.

In the case where "a given image correction is performed if possible" as in (3) above, the image correction may be accomplished for an isolated line, for example, with no dots marked in the two adjacent pixels before and after it by filling image data D (i, j) in positions (i−1, j) and (i+1, j). Where the resolution is as high as 1200 dpi, for example, an aberration by one pixel is equivalent to about 20 μm so that an image defect resulting from an aberration of one pixel is hardly perceivable.

Figure 8A:
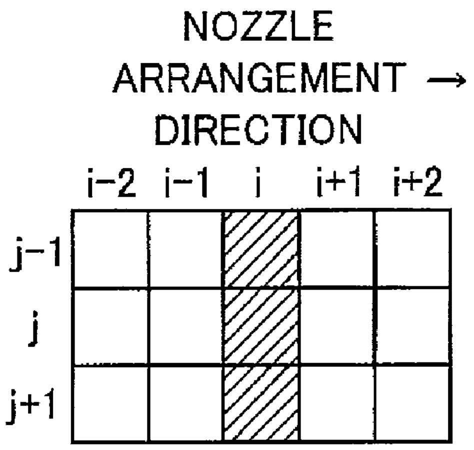
FIGS. 8A and 8B are views for explaining another method of detecting an inconsistency correction unfit image.
Figure 8B:
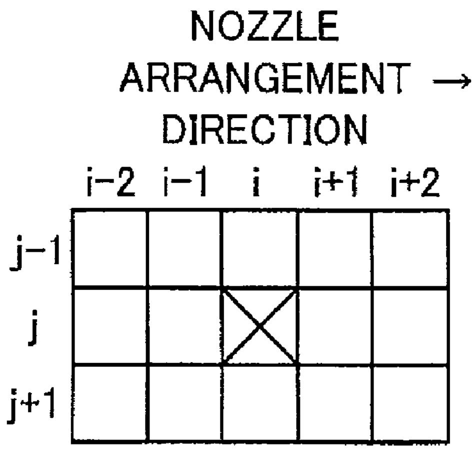

The above correction involving shifted pixels presupposes verification that there are no dots in the two adjacent pixel before and after the pixel of interest. To that end, therefore, a defective pixel needs to have been detected using a 5×3 mask as illustrated in FIGS. 8A and 8B instead of the 3×3 mask of FIGS. 6A and 6B referred to earlier.

Specifically, an original image is binarized (either image data has a value of 1 or more or no image data exits) to find the sum of values after the binarization in a column range of "i−2" to "i+2," where (i, j) represents a pixel of interest. When the calculated sum is 0 in the other columns than i and 3 in the column i, a judgment may be made that the pixel is impossible to correct but a pixel shifting is possible. Then, the value of image data D (i, j) may be replaced by D (i−1, j) or D (i+1, j) in the image correction processing step 90J.

The other processing may be substantially performed through conventional inconsistent density correction processing.

As has been described above in detail, the invention produces remarkable effects of detecting an image of which inconsistency cannot be appropriately corrected by any known inconsistency correction method and enabling an appropriate treatment thereof taking this into consideration by an inventive image processing method and with an image forming device using this method.

Further, the inventive image processing method and the image forming device using this method permit entering the kinds of rectification with which to address anomalies and the corresponding levels and further, depending upon the configuration, correcting an abnormal image.

More specifically, the invention produces significant effects of achieving an image forming method and an image forming device whereby an appropriate treatment can be provided even when, for example, a nozzle in the recording head fails to discharge ink to draw line-work images because of a variation among nozzle characteristics, which is a problem associated with single-pass printers.

An ink jet recorder, an embodiment of the image forming device according to the invention, comprises a liquid discharge head (recording head) and discharge control means. The liquid discharge head comprises arrays of liquid discharge elements (recording elements) including ink drop discharge nozzles for forming dots and pressure generating means (such as piezoelectric elements and heating elements) for generating a discharge pressure. The discharge control means controls discharge of liquid from the recording head according to ink discharge data produced from image data.

The recording head may be configured, for example, as a full-line head comprising recording elements arranged along a length covering the full width of a recording medium. The full-line type recording head may be configured by connecting recording head modules each having a relatively short row of recording elements shorter than the full length of the recording medium to provide rows of recording elements such that each line of connected modules has a length to cover the full length of the recording medium.

While a full-line type head typically is configured to have recording elements arranged in a direction normal to the direction in which the recording medium is relatively moved (direction in which the recording medium is relatively transported), it may also be configured such that the recording elements are arranged at a given angle to a direction normal to the transport direction.

The recording medium herein is a medium on which an image is recorded by a recording head (e.g., a medium on which an image is formed, a recording medium, a medium capable of receiving an image thereon, and a medium to which ink is discharged by an ink jet recorder) and includes continuous paper, cut sheets of paper, rolls of paper, resin sheets such as viewgraphs, films, cloth, intermediate transfer media, printed wiring boards on which a wiring pattern is printed by an ink jet recorder, and a variety of other media not limited in material and shape.

The transport means may be such that a recording medium is moved relative to a stationary (fixed) recording head, or a recording head is moved relative to a stationary recording medium, or alternatively both a recording head and a recording medium are moved.

To form a color image using an ink jet head, a recording head may be provided for each of the different color inks (recording liquids) used or a single recording head may be adapted to discharge different colors of ink.

The invention may be applied not only to a full-line type recording head as described above but also to a shuttle-scan type recording head (a recording head that discharges ink as it reciprocates in a direction substantially normal to the direction in which the recording medium is transported).

In the unfit image detection step in the image processing method of the invention, input image data is compared with various detection patterns provided for typical unfit patterns such as an isolated vertical line (see FIG. 6A) to find a matching detection pattern for the input image data, if any, and determine whether the image of interest is an unfit image.

The unfit image detection means as used in the image forming device of the invention is an embodiment of means for accomplishing the above step.

While the invention has been described in detail, the above embodiments are only illustrative and not restrictive and various changes and modifications may be made without departing from the spirit of the invention.

What is claimed is:

1. An image processing method used in an image forming in which ink drops are discharged from a plurality of recording elements of a recording head toward a recording medium as the recording head and the recording medium are moved relative to each other to convert an input image having an M number of tones into an image having an N number of tones (N<M) on the recording medium, the method comprising:

a characteristic information acquiring step of acquiring recording characteristic information of the recording elements;

an inconsistent density correction information calculating step of obtaining inconsistent density correction information from the recording characteristic information acquired in the characteristic information acquiring step;

a density correction processing step of obtaining inconsistency corrected image data from the inconsistent density correction information and data of the input image;

an unfit image detection step of generating inconsistency correction unfit image position information by detecting an inconsistency correction unfit image from data of the input image;

an N-value conversion processing step of obtaining image data having an N number of tones from the inconsistency corrected image data;

an image anomaly judgment processing step of judging whether non-correctable conditions arise according to the inconsistent density correction information and the inconsistency correction unfit image position information; and an image anomaly alerting step of alerting a user to an image anomaly according to judgment results given in the image anomaly judgment processing step.

2. The image processing method according to claim 1, wherein the unfit image detection step is performed to detect a line-work image.

3. An image processing method according to claim 1, further comprising a treatment instruction receiving step of allowing the user to select a treatment in response to occurrence of a predetermined abnormal image.

4. An image forming device comprising:

printing means including a full-line type recording head having a plurality of recording elements arranged over a length corresponding to a full width of a recording medium;

transporting means that moves the recording head relative to the recording medium by moving at least one of the recording head and the recording medium;

information acquiring means that acquires information indicating recording characteristics including a recording position error and discharge failure of the recording elements;

inconsistent density correction information calculating means that obtains inconsistent density correction information based on the recording characteristic information acquired by the information acquiring means;

density correction processing means that obtains inconsistency corrected image data from the inconsistent density correction information and data of the input image;

unfit image detection means that generates inconsistency correction unfit image position information by detecting an inconsistency correction unfit image from data of the input image;

N-value conversion processing means that obtains image data having an N number of tones from the inconsistency corrected image data;

image anomaly judgment processing means that judges whether non-correctable conditions arise according to the inconsistent density correction information and the inconsistency correction unfit image position information; and image anomaly alert means that alerts a user to an image anomaly according to judgment results given by the image anomaly judgment processing means.

5. The image forming device according to claim 4, wherein the unfit image detection means detects a line-work image.

6. The image forming device according to claim 4, further comprising treatment instruction receiving means that allows the user to select a treatment in response to occurrence of a predetermined abnormal image.

* * * * *